United States Patent
Li et al.

(10) Patent No.: US 12,055,451 B2
(45) Date of Patent: *Aug. 6, 2024

(54) DEVICE AND METHOD OF FORCE SENSING AND APPARATUS

(71) Applicant: SHENZHEN NEW DEGREE TECHNOLOGY CO., LTD., Guangdong (CN)

(72) Inventors: Hao Li, Guangdong (CN); Xuepeng Lin, Guangdong (CN)

(73) Assignee: SHENZHEN NEW DEGREE TECHNOLOGY CO., LTD., Shenzhen (CN)

( * ) Notice: Subject to any disclaimer, the term of this patent is extended or adjusted under 35 U.S.C. 154(b) by 221 days.

This patent is subject to a terminal disclaimer.

(21) Appl. No.: 17/639,230

(22) PCT Filed: Aug. 30, 2019

(86) PCT No.: PCT/CN2019/103863
§ 371 (c)(1),
(2) Date: Feb. 28, 2022

(87) PCT Pub. No.: WO2021/035741
PCT Pub. Date: Mar. 4, 2021

(65) Prior Publication Data
US 2022/0326101 A1    Oct. 13, 2022

(51) Int. Cl.
*G01L 1/22* (2006.01)
*G01L 5/1627* (2020.01)

(52) U.S. Cl.
CPC .......... *G01L 1/2293* (2013.01); *G01L 1/2262* (2013.01); *G01L 5/1627* (2020.01)

(58) Field of Classification Search
CPC .... G01L 1/2293; G01L 1/2262; G01L 5/1627
See application file for complete search history.

(56) References Cited

U.S. PATENT DOCUMENTS

| | | | |
|---|---|---|---|
| 3,554,025 A | | 1/1971 | Andersson et al. |
| 4,862,298 A | * | 8/1989 | Genheimer ............ G11B 33/08 360/75 |

(Continued)

FOREIGN PATENT DOCUMENTS

| CN | 1916579 | 2/2007 |
|---|---|---|
| CN | 208653681 | 3/2019 |

(Continued)

OTHER PUBLICATIONS

International Search Report for PCT/CN2019/103863 mailed Jun. 9, 2020, 4 pages.

*Primary Examiner* — Kyung S Lee
(74) *Attorney, Agent, or Firm* — NIXON & VANDERHYE, P.C.

(57) ABSTRACT

A device of force sensing, which includes a rigid structure and force sensors. The rigid structure includes rigid blocks spaced apart, and a strain amplification area is formed between two adjacent rigid blocks, every two force sensors in four force sensors are used as a group, and two groups of the force sensors are selectively arranged corresponding to two of the mounting surfaces of the strain amplification area, the four force sensors are connected to form different bridge circuits.

15 Claims, 6 Drawing Sheets

(56) References Cited

U.S. PATENT DOCUMENTS

| | | | | |
|---|---|---|---|---|
| 7,784,363 B2* | 8/2010 | Ihrke | .................. | G01L 5/226 |
| | | | | 73/862.041 |
| 7,997,155 B2* | 8/2011 | Maeda | .................. | G01B 7/18 |
| | | | | 73/862.627 |
| 11,162,851 B2* | 11/2021 | Li | .................. | G01L 1/127 |
| 2012/0006124 A1* | 1/2012 | Mathias | .................. | G01B 7/16 |
| | | | | 73/788 |

FOREIGN PATENT DOCUMENTS

| | | |
|---|---|---|
| DE | 2141292 | 2/1973 |
| EP | 0487546 | 6/1992 |
| WO | 2018/133054 | 7/2018 |

* cited by examiner

DEVICE AND METHOD OF FORCE SENSING AND APPARATUS

CROSS REFERENCE TO RELATED APPLICATION

This application is a National Stage Application filed under 35 USC 371 of International Patent Application No. PCT/CN2019/103863 with an international filing date of Aug. 30, 2019, designating the United States, now pending. The content of said international application is incorporated herein by reference.

TECHNICAL FIELD

The present application relates to the technical field of pressure sensing, and more particularly to a device of force sensing, a method of force sensing using the device of force sensing, and an apparatus having the device of force sensing.

BACKGROUND

There are various pressure sensing technologies in the field of pressure sensing. These technologies use different types of sensors, combined with specific structures and circuits to detect the deformation of the object to be measured to a certain extent. At present, there are common resistance strain gauges, pressure capacitance technology, pressure inductance technology, piezoelectric ceramic technology, Micro-Electro-Mechanical System (MEMS) pressure sensor technology, etc. In addition to the shortcomings such as complicated in structure and mounting, low sensitivity, low anti-drop coefficient and easy to false touch, these technologies can only accurately detect the deformation in one-dimensional direction, the reliability of pressure detection is not high.

Technical Problem

One of the objects of embodiments of the present application is to provide a device of force sensing, a method of force sensing, and an apparatus, in order to solve the technical problems that the existing pressure sensing technologies complicated in structure and mounting or can only accurately detect the deformation in one-dimensional direction.

SUMMARY

In order to solve above technical problems, the technical solution adopted in embodiments of the present application is:

In a first aspect, a device of force sensing is provided, and the device of force sensing includes:

a rigid structure, configured for fitting with an object to be measured and deforming with the object to be measured, the rigid structure includes rigid blocks spaced along a X-axis, a strain amplification area is formed between two adjacent rigid blocks, and the rigid structure is provided with four mounting surfaces formed around the strain amplification area; and a plurality of force sensors, arranged at the strain amplification area, every two force sensors in four force sensors are used as a group, and two groups of the force sensors are selectively arranged corresponding to two of the mounting surfaces, the four force sensors are connected to form different bridge circuits, and the different bridge circuits are electrically connected to a signal processing circuit to detect deformation of the rigid structure in different directions and obtain a force at a corresponding direction of the object to be measured.

In a second aspect, a method of force sensing is provided, which uses the device of force sensing above, and the method includes steps of:

fitting a rigid structure on an object to be measured; and connecting four force sensors in a same strain amplification area to form different bridge circuits, the different bridge circuits are electrically connected to a signal processing circuit to detect deformation of the rigid structure in different directions and obtain a force at a corresponding direction of the object to be measured.

In a third aspect, an apparatus is provided, which includes an object to be measured and the device of force sensing above, and the rigid structure is fitted on the object to be measured.

The beneficial effects of the device of force sensing, the method of force sensing, and the apparatus provided by the embodiments of the present application are that: the rigid structure includes the rigid blocks arranged at intervals, the strain amplification area is formed between two adjacent rigid blocks, and every two of the four force sensors are used as a group, two groups of force sensors are selectively arranged on two of the mounting surfaces of the strain amplification area, and the four force sensors are connected to form different bridge circuits. When in use, the rigid structure is fitted to the object to be measured, and different bridge circuits are electrically connected to the signal processing circuit, so as to detect the deformation of the rigid structure in different directions and obtain the force in the corresponding direction of the object to be measured. The device of force sensing has an integrated structure, which is easy to be mounted, the circuit is simple and the cost is low. The device of force sensing, the method of force sensing and the apparatus having the device of force sensing can very sensitively detect the small deformation of the object to be measured in the multi-dimensional direction, accurately identify the pressure, and the performance indicators of no false touch, high sensitivity, high anti-drop coefficient and high reliability, etc. are reached.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DETAILED DESCRIPTION

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

In the description of embodiments of the present application, it is noted that the terms such as "up", "down", "front", "rear" "left", "right" "vertical", "horizontal", "top", "bottom", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application.

In addition, terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

In the present application, unless there is additional explicit stipulation and limitation, terms such as "mount", "connect with each other", "connect", "fix", and so on should be generalizedly interpreted, for example, "connect" can be interpreted as being fixedly connected, detachably connected, or connected integrally; "connect" can also be interpreted as being mechanically connected or electrically connected; "connect" can be further interpreted as being directly connected or indirectly connected through intermediary, or being internal communication between two components or an interaction relationship between the two components. For the one of ordinary skill in the art, the specific meanings of the aforementioned terms in the present application can be interpreted according to specific conditions.

Figure 1:
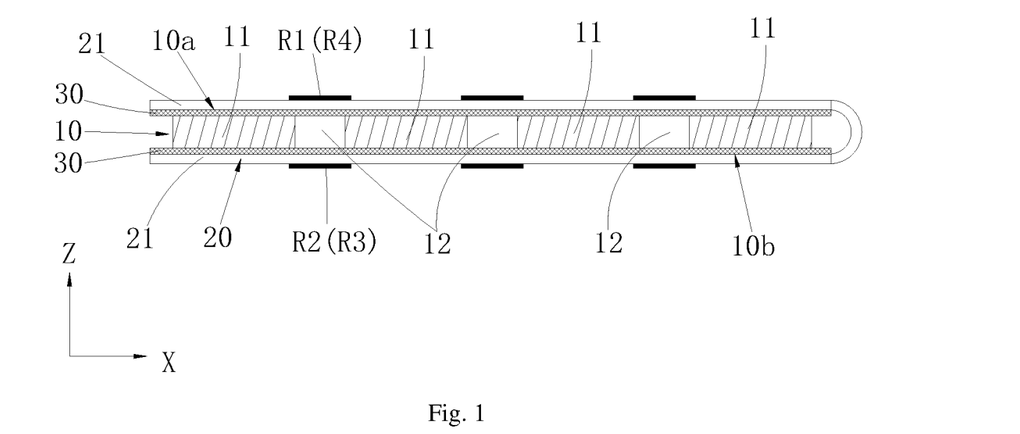
FIG. 1 is a schematic assembly view of a device of force sensing provided by an embodiment of the present application.
Figure 2:
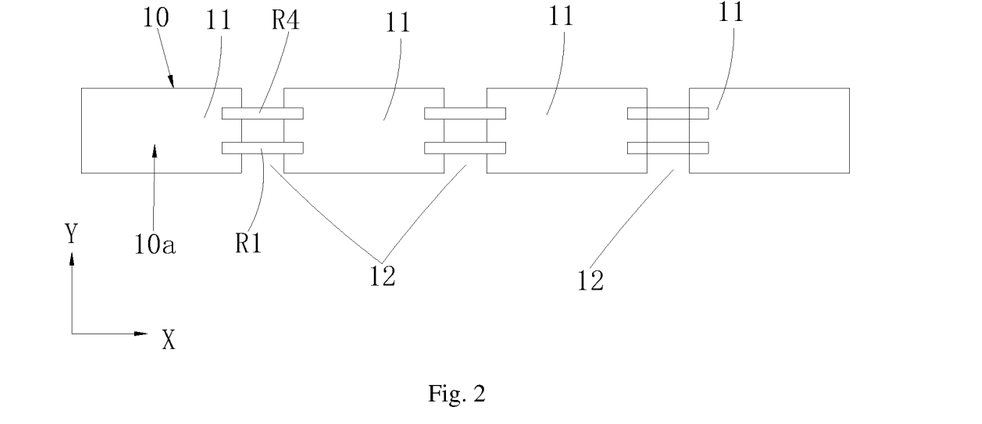
FIG. 2 is a front view of the device of force sensing of FIG. 1.
Figure 3:
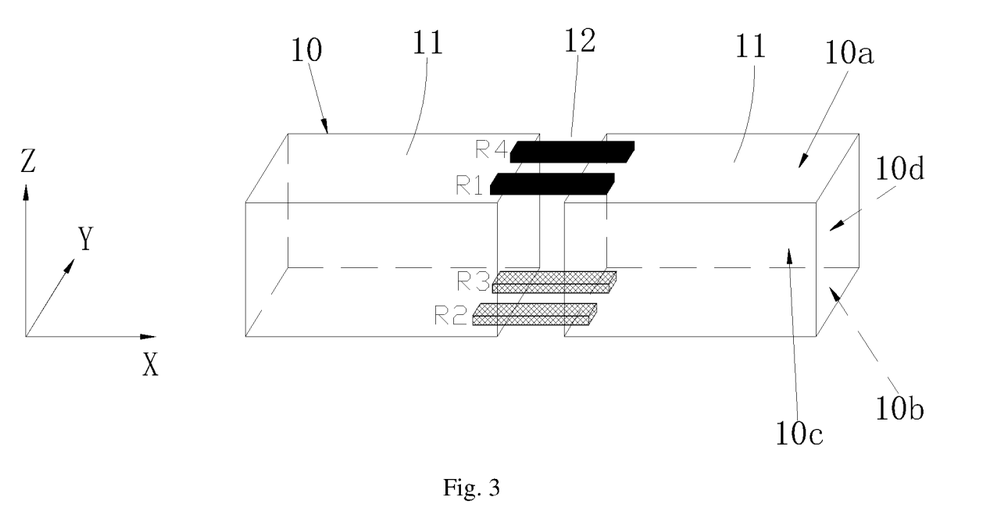
FIG. 3 is a three-dimensional structural view of a device of force sensing provided by an embodiment of the present application.
Figure 6:
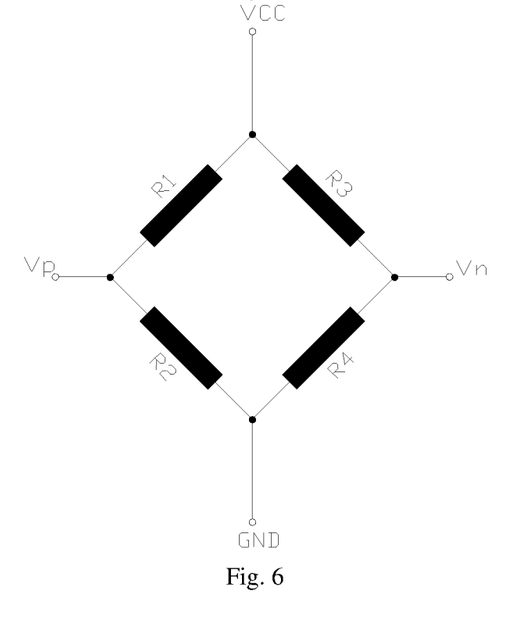
FIG. 6 is a schematic diagram of a bridge circuit provided by an embodiment of the present application.
Figure 7:
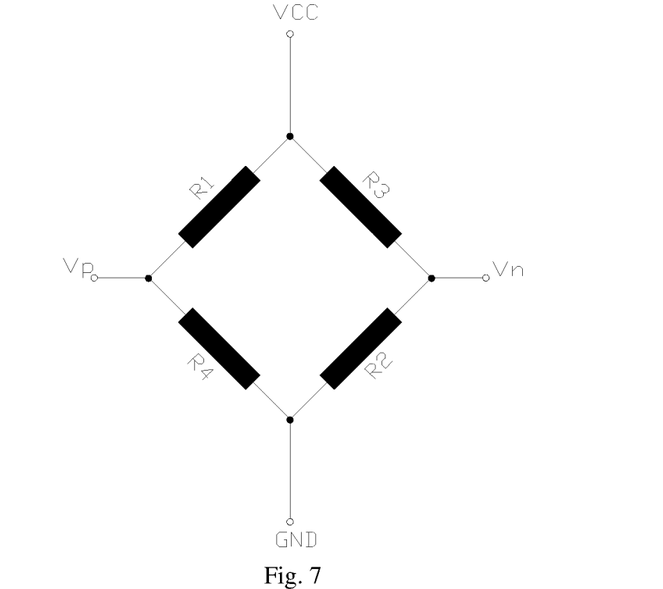
FIG. 7 is a schematic diagram of a bridge circuit provided by another embodiment of the present application.
Figure 8:
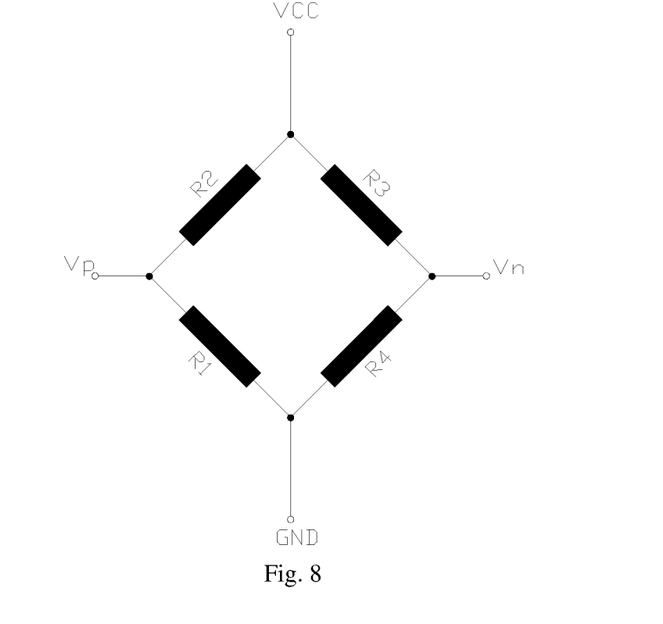
FIG. 8 is a schematic diagram of a bridge circuit provided by another embodiment of the present application.

Referring to FIGS. 1 to 3, an embodiment of the present application provides a device of force sensing, which includes a rigid structure 10 and force sensors R1, R2, R3, and R4. The rigid structure 10 is used to fit with the object to be measured (not shown) and follow the deformation of the object to be measured. The rigid structure 10 includes rigid blocks 11 spaced along the X-axis, and a strain amplification area 12 is formed between two adjacent rigid blocks 11. The rigid structure 10 forms four mounting surfaces 10*a*, 10*b*, 10*c*, 10*d* around the strain amplification area 12; a plurality of force sensors are arranged in the strain amplification area 12, wherein each two of the four force sensors R1, R2, R3, R4 are used as a group, and two groups of force sensors are selectively arranged on two of the mounting surfaces. The four force sensors are connected to form different bridge circuits (as shown in FIG. 6 to FIG. 8), different bridge circuits are electrically connected to the signal processing circuit to detect the deformation of the rigid structure 10 in different directions and obtain the force of the object to be measured in the corresponding direction.

The rigid structure 10 includes the rigid blocks 11 arranged at intervals, the strain amplification area 12 is formed between two adjacent rigid blocks 11, and every two of the four force sensors R1, R2, R3, R4 are used as a group, two groups of force sensors are selectively arranged on two of the mounting surfaces 10*a*, 10*b*, 10*c*, 10*d* of the strain amplification area 12, and the four force sensors are connected to form different bridge circuits. When in use, the rigid structure 10 is fitted to the object to be measured, and different bridge circuits are electrically connected to the signal processing circuit, so as to detect the deformation of the rigid structure 10 in different directions and obtain the force in the corresponding direction of the object to be measured. The device of force sensing has an integrated structure, which is easy to be mounted, the circuit is simple and the cost is low. The device of force sensing, the method of force sensing and the apparatus having the device of force sensing can very sensitively detect the small deformation of the object to be measured in the multi-dimensional direction, accurately identify the pressure, and the performance indicators of no false touch, high sensitivity, high anti-drop coefficient and high reliability, etc. are reached.

It should be noted that the signal processing circuit is electrically connected to the bridge circuits, analyzes and processes the electrical signals of the force sensors, and converts the force analog signals into the force digital signals, which belongs to the prior art.

In another embodiment of the present application, the rigid structure 10 is fitted to the surface of the object to be measured through a glue (not shown), which is easy to be assembled. When the object to be measured is subjected to a force, the rigid structure 10 follows the deformation of the object to be measured, the deformation of the strain amplification area 12 is amplified, and the impedance of each force sensor changes accordingly. The force sensors are electrically connected to the signal processing circuit, thereby generating pressure signals, the direction, magnitude and location of the force can be identified by analyzing the characteristics of the pressure signals. Specifically, the glue can be VHB, double-sided glue, 502 glue, thermosetting glue, etc., which can be selected as required.

In another embodiment of the present application, the rigid structure 10 has a certain rigidity, the strain amplification area 12 is a hollow-out area, and the force sensors are arranged in the strain amplification area 12. When the object to be measured is subjected to a force, the rigid structure 10 follows the deformation of the object to be measured, and the deformation of the strain amplification region 12 is amplified, so that the deformation of the rigid structure 10 can be detected by the force sensors. Specifically, the rigid structure 10 can be a steel sheet, an aluminum sheet, a glass sheet, a FR4 sheet or other composite rigid materials, which can be selected as required.

In another embodiment of the present application, the rigid structure 10 is provided with flexible substrates 21 on two mounting surfaces corresponding to two groups of force sensors, and the two groups of force sensors are respectively mounted on the corresponding flexible substrates 21. The flexible substrates 21 with the force sensors attached are bonded onto the discrete rigid blocks 11 of a certain size through the glue 30, and the four force sensors are facing or adjacently arranged at the strain amplification area 12 between two adjacent discrete rigid blocks 11 to constitute a device of force sensing, and the structure is easy to be formed. Specifically, the flexible substrate 21 may be flexible printed circuit board (FPC), high temperature resistant polyester film (PET), polyimide film (PI film) or other flexible substrates with good flatness, which can be selected as required.

Referring to FIG. 1, in another embodiment of the present application, two flexible substrates 21 are formed by bending a master substrate 20. The force sensors are arranged on two adjacent mounting surfaces or on two opposite mounting surfaces, the force sensors can be attached to a master substrate 20, and then the center of the master substrate 20 is folded and the two inner surfaces are bonded to the two mounting surfaces, the processing is simple and the cost is low.

In another embodiment of the present application, the flexible substrate 21 and the surface of the rigid structure 10 are bonded by a glue 30. This structure facilitates the connection between the rigid structure 10 and the flexible substrate 21, and allows the flexible substrate 21 and the rigid structure 10 to follow the deformation of the object to be measured when the object to be measured is deformed by a force. The glue 30 can be made of epoxy adhesive film, 502 glue, thermosetting glue, silica gel and other materials, which can be selected as required.

Figure 4:
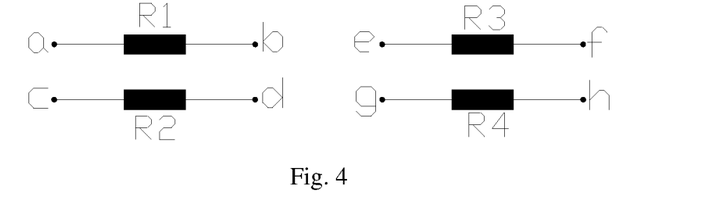
FIG. 4 is a schematic view of a force sensor applied in the device of force sensing of FIG. 3.
Figure 5:
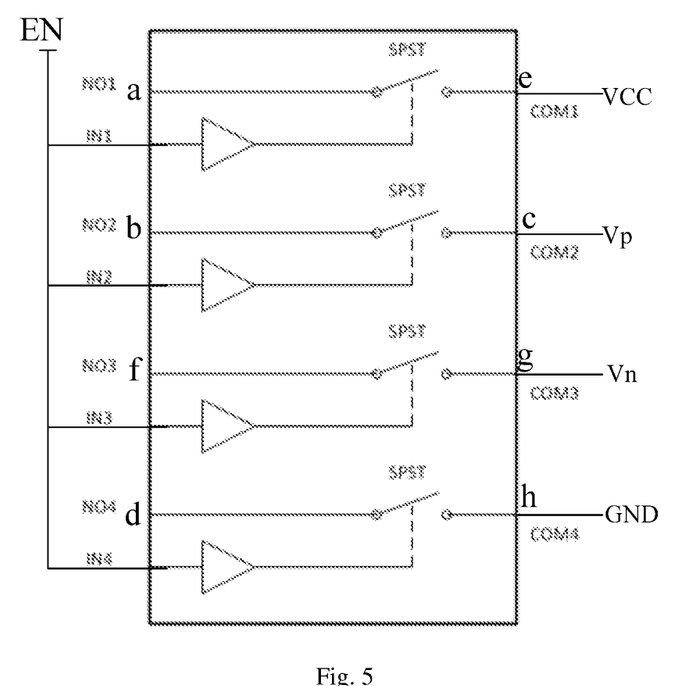
FIG. 5 is a connection schematic view of an analog switch applied in the device of force sensing of FIG. 3.

Referring to FIG. 4 and FIG. 5, in another embodiment of the present application, the four force sensors R1, R2, R3, R4, the power supply terminal VCC, the ground terminal GND and the detection terminals Vp, Vn of the same bridge circuit are connected through the analog switches. The solution is easy to be assembled, and the analog switches can be used to connect four force sensors to form different bridge circuits, and control the on-off switching of the bridge circuits, which is easy to be operated.

Specifically, the analog switch can be a single-pole single-throw analog switch. The single-pole single-throw analog switch has a NO terminal, a COM terminal and a IN terminal. The circuits that requires to be short-circuited (two ends of the four force sensors R1, R2, R3, R4) are connected to the COM terminal and the IN terminal according to the predetermined connection manner. The COM terminals are respectively connected to the power terminal VCC, the ground terminal GND, and the detection terminals Vp and Vn to obtain a predetermined bridge circuit. The IN terminals are used to receive an enable signal to control the SPST.

For example, if the bridge circuit shown in FIG. 6 is to be formed, the two ends of the four force sensors R1, R2, R3, and R4 shown in FIG. 4 need to be connected to the NO terminal and the COM terminal of the single-pole single-throw analog switch with reference to the connection manner shown in FIG. 5, and the COM terminals are respectively connected to the power terminal VCC, the ground terminal GND and the detection terminals Vp and Vn. When the IN terminal receives the enable signal, the corresponding NO terminal and the COM terminal are turned on to form a predetermined bridge circuit. When the IN terminal does not receive the enable signal, the corresponding NO terminal is disconnected from the COM terminal. Understandably, if the bridge circuit as shown in FIG. 7 or FIG. 8 is to be formed, the two ends of the four force sensors R1, R2, R3, and R4 need to be connected to the NO terminal and the COM terminal of the single-pole single-throw analog switch in the corresponding connection manner, to obtain the bridge circuit shown in FIG. 7 or FIG. 8.

Specifically, the single-pole single-throw analog switch can choose the TS3A4751, which is a bidirectional, 4-channel, normally open (NO) single-pole single-throw (SPST) analog switch, which can be used to connect four force sensors to form different electrical bridge circuits, and control the on-off switching of the bridge circuits.

Referring to FIG. 3 and FIGS. 9 to 11, in another embodiment of the present application, the length directions of the force sensors R1, R2, R3, and R4 are parallel to the X-axis; the four mounting surfaces are respectively the first surface 10a and the second surface 10b spaced along the Z-axis, and the third surface 10c and the fourth surface 10d spaced along the Y-axis; the first surface 10a is used as the surface to be attached to the object to be measured, the X-axis, the Y-axis and the Z-axis are in pairs perpendicular to each other. The structure is easy to assemble force sensors, and the force in different directions can be detected by the force sensors. Specifically, the first surface 10a and the second surface 10b of the rigid structure 10 are both parallel to the X-Y plane, and the third surface 10c and the fourth surface 10d are both parallel to the X-Z plane.

Referring to FIG. 3, in another embodiment of the present application, for the same bridge circuit, two groups of force sensors (one group includes R1 and R4, and the other group includes R2 and R3) are correspondingly disposed on the first surface 10a and the second surface 10b, the plane where the two force sensors R1, R2 arranged adjacent to the third surface 10c are located is perpendicular to the Y-axis, the plane where the two force sensors R3, R4 arranged adjacent to the fourth surface 10d are located is perpendicular to the Y-axis. The four force sensors are connected to form different bridge circuits, and the bridge circuits are electrically connected to the signal processing circuit. Through different signal characteristics, the force of different dimensions sensed by the object to be measured can be identified, and multi-dimensional force sensing can be realized. In the following, the description will be made with the embodiment of two bridge circuits.

Bridge Circuit Embodiment 1:

When a group of force sensors R1 and R4 arranged on the first surface 10a are used as a group of opposite bridge arms, and a group of force sensors R2 and R3 arranged on the second surface 10b are used as another group of opposite bridge arms, the bridge circuit is electrically connected to the signal processing circuit to detect the deformation of the rigid structure 10 on the Z-axis and obtain the pressure of the Z-axis of the object to be measured.

Specifically, referring to FIG. 4 and FIG. 5, after selecting through the analog switch, the a and c are short-circuited to the VCC, the b and c are short-circuited to the Vp, the f and g are short-circuited to the Vn, and the d and h are short-circuited to GND respectively. The bridge circuit shown in FIG. 6 is obtained.

Setting VCC=$Ui$, to obtain:

$Vp = R2Ui/(R1+R2)$;

$Vn = R4Ui/(R3+R4)$;

$Uo = Vp - Vn = (R2R3 - R1R4)\ Ui/[(R1+R2)(R3+R4)]$   Formula group 1

Taking the derivation of R1, R2, R3 and R4 respectively, it can be seen that Uo increases with the increase of R2 and R3, and decreases with the increase of R1 and R4.

Z-Axis Deformation:

Viewed from the Z-axis (up and down) direction, R1 and R4 are in the same plane, and R2 and R3 are in the same plane.

When the object to be measured is subjected to a force from top to bottom, the rigid structure 10 will follow the object to be measured to generate a top-to-bottom bending deformation. Affected by the curvature, the force sensor R2 and R3 will be stretched to lengthen the length of the force sensors, while R1 and R4 will be squeezed to reduce the length of the force sensors. Here is an example of force sensors whose characteristic is that lengthening increases the resistance, so R2 and R3 will increase, and R1 and R4 will decrease. In short, when pressing from top to bottom, the R2 and R3 increase, and the R1 and R4 decrease. From the above conclusion, it can be seen that the Uo will increase in the positive direction. In the same way, when the object to be measured is subjected from a force applied from the bottom to the top, the Uo will increase in the negative direction.

Y-Axis Deformation:

Viewed from the Y-axis (front and rear) direction, the R1 and R2 are in the same plane, and the R3 and R4 are in the same plane. When the object to be measured is subjected to a force from front to back, the rigid structure 10 will generate a front-to-back bending deformation, the R4 and R3 will be stretched approximately the same and the length of the force sensor will be lengthened, and the R1 and R2 will be squeezed approximately the same and the length of the force sensor will be decreased, that is, R3 and R4 increase at the same time and the proportion of increase is close, and R1 and R2 decrease at the same time and the proportion of decrease is close, so both the Vp and Vn remain basically unchanged. In short, so when pressing from front to back, Uo=Vp−Vn basically remains the same. Similarly, when the object to be measured subjected from a force applied from the back to the front, the Uo remains basically unchanged.

Therefore, the embodiment 1 of the bridge circuit can identify the pressure in the Z-axis (up and down) direction of the object to be measured according to the signal characteristics generated by Uo.

Bridge Circuit Embodiment 2:

When the two force sensors R1 and R2 arranged adjacent to the third surface 10c are used as a group of opposite bridge arms, and the two force sensors R3 and R4 arranged adjacent to the fourth surface 10d are used as another group of opposite bridge arms, the bridge circuit is electrically connected to the signal processing circuit to detect the deformation of the rigid structure 10 on the Y-axis and obtain the pressure of the Y-axis of the object to be measured.

Specifically, referring to FIG. 4, after selecting through the analog switch, the a and e are short-circuited to the VCC, the b and g are short-circuited to the Vp, the f and c are short-circuited to the Vn, and the d and h are short-circuited to GND respectively. The bridge circuit shown in FIG. 7 is obtained.

Setting VCC=$Ui$, to obtain:

$Vp = R4Ui/(R1+R4);$ $Vn = R2Ui/(R3+R2);$ $Uo = Vp - Vn = (R3R4 - R1R2) \, Ui/[(R1+R4)(R3+R2)]$   Formula group 2

Taking the derivation of R1, R2, R3 and R4 respectively, it can be seen that Uo increases with the increase of R4 and R3, and decreases with the increase of R1 and R2.

Z-Axis Deformation:

Viewed from the Z-axis (up and down) direction, R1 and R4 are in the same plane, and R2 and R3 are in the same plane.

When the object to be measured is subjected to a force from top to bottom, the rigid structure 10 will correspondingly generate a bending deformation from top to bottom, the R2 and R3 will be stretched approximately the same to lengthen the length of the force sensors, and the R1 and R4 will be stretched approximately the same and the length of the force sensor will be lengthened, that is, R2 and R3 increase at the same time and the increase ratio is close, and R1 and R4 decrease at the same time and the decrease ratio is close. Substitute the data before and after the change into Formula group 2, both Vp and Vn basically remain unchanged. So when pressing from top to bottom, Uo=Vp−Vn basically remains unchanged. Similarly, when the object to be measured is subjected to a force from bottom to top, the Uo remains basically unchanged.

Y-Axis Deformation:

Viewed from the Y-axis (front and rear) direction, the R1 and R2 are in the same plane, and R3 and R4 are in the same plane.

When the object to be measured is subjected to a force from the front to the rear, the rigid structure 10 will follow the object to be measured to generate a front-to-back bending deformation. Affected by the curvature, the force sensor R2 and R3 will be stretched to lengthen the length of the force sensors, while R1 and R4 will be squeezed to reduce the length of the force sensors. So the R3 and R4 will increase and the R1 and R2 will decrease. When pressing from top to bottom, substitute the before and after the change of R into Formula group 2, and Uo=Vp−Vn will increase in the positive direction. Similarly, when the object to be measured is subjected to a force from the back to the front, the Uo will increase in the negative direction.

Therefore, the embodiment 2 of the bridge circuit can identify the pressure in the direction of the Y-axis (front and rear) according to the signal characteristics generated by Uo.

The above shows that by connecting the four force sensors to form different bridge circuits, or by using the analog switch to select the circuit in real time to form different bridge circuits, the force of different dimensions sensed by the object to be measured can be identified according to the signals, and multi-dimensional force sensing can be realized. In addition to detecting multi-dimensional deformation, the device of force sensing also has the advantages of small temperature and humidity drift, high sensitivity, and convenient installation.

Figure 9:
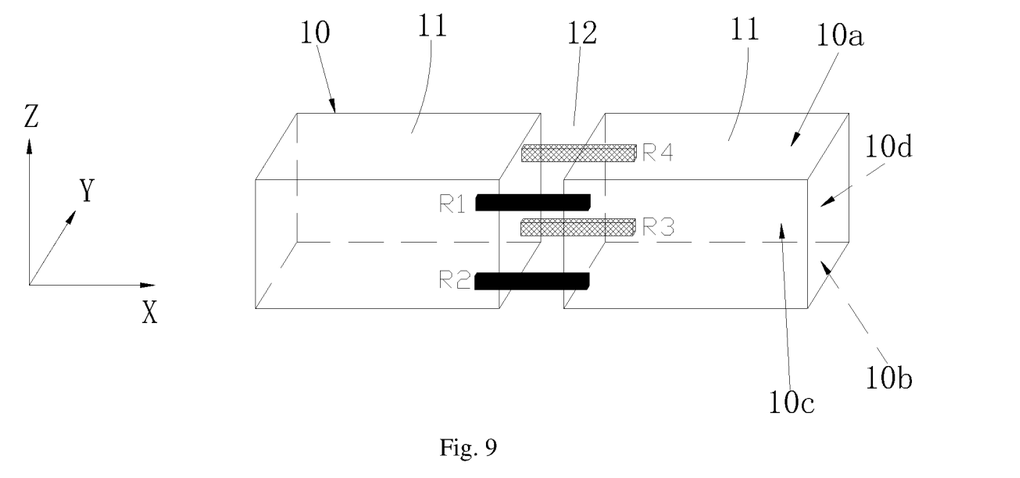
FIG. 9 is a three-dimensional structural view of a device of force sensing provided by another embodiment of the present application.

Referring to FIG. 9, in another embodiment of the present application, for the same bridge circuit, two groups of force sensors (one group includes R1 and R2, and the other group includes R3 and R4) are correspondingly disposed on the third surface 10c and the fourth surface 10d, the plane where the two force sensors R1, R4 arranged adjacent to the first surface 10a are located is perpendicular to the Z-axis, the plane where the two force sensors R2, R3 arranged adjacent to the second surface 10b are located is perpendicular to the Z-axis. The four force sensors are connected to form different bridge circuits, and the bridge circuits are electrically connected to the signal processing circuit. Through different signal characteristics, the force of different dimensions sensed by the object to be measured can be identified, and multi-dimensional force sensing can be realized.

Placing the force sensors on the third surface 10c and the fourth surface 10d, avoid full contact between the force sensors on one surface and the glue, and ensure that the environmental conditions where the four force sensors are located are the same or very close, which is convenient to eliminate or reduce the effects caused by environmental factors such as temperature, humidity, and electromagnetic interference, etc. When the object to be measured is severely impacted in the positive direction, the force sensors do not follow the object to be measured to bear the positive impact, which enhances the reliability of the device. In the following, the description will be made with the embodiment of two bridge circuits.

Bridge Circuit Embodiment 3:

When a group of force sensors R1 and R4 arranged on the first surface 10a are used as a group of opposite bridge arms, and a group of force sensors R2 and R3 arranged on the second surface 10b are used as another group of opposite bridge arms, the bridge circuit is electrically connected to the signal processing circuit to detect the deformation of the rigid structure 10 on the Z-axis and obtain the pressure of the Z-axis of the object to be measured.

Specifically, for the four force sensors shown in FIG. 9, referring to FIG. 4, after selecting through the analog switch, the a and c are short-circuited to the VCC, the b and c are short-circuited to the Vp, the f and g are short-circuited to the Vn, and the d and h are short-circuited to GND respectively. The bridge circuit shown in FIG. 6 is obtained.

Setting $VCC=Ui$, to obtain:

$Vp=R2Ui/(R1+R2)$;

$Vn=R2Ui/(R3+R4)$;

$Uo=Vp-Vn=(R2R3-R1R4)\ Ui/[(R1+R2)(R3+R4)]$  Formula group 3

Taking the derivation of R1, R2, R3 and R4 respectively, it can be seen that Uo increases with the increase of R2 and R3, and decreases with the increase of R1 and R4.

Z-Axis Deformation:

Viewed from the Z-axis (up and down) direction, R1 and R4 are in the same plane, and R2 and R3 are in the same plane.

When the object to be measured is subjected to a force from top to bottom, the rigid structure 10 will follow the object to be measured to generate a top-to-bottom bending deformation. Affected by the curvature, the force sensor R2 and R3 will be stretched to lengthen the length of the force sensors, while R1 and R4 will be squeezed to reduce the length of the force sensors. Here is an example of force sensors whose characteristic is that lengthening increases the resistance, so R2 and R3 will increase, and R1 and R4 will decrease. In short, when pressing from top to bottom, the R2 and R3 increase, and the R1 and R4 decrease. From the above conclusion, it can be seen that the Uo will increase in the positive direction. In the same way, when the object to be measured is subjected from a force applied from the bottom to the top, the Uo will increase in the negative direction.

Y-Axis Deformation:

Viewed from the Y-axis (front and rear) direction, the R1 and R2 are in the same plane, and the R3 and R4 are in the same plane. When the object to be measured is subjected to a force from front to back, the rigid structure 10 will generate a front-to-back bending deformation, the R4 and R3 will be stretched approximately the same and the length of the force sensor will be lengthened, and the R1 and R2 will be squeezed approximately the same and the length of the force sensor will be decreased, that is, R3 and R4 increase at the same time and the proportion of increase is close, and R1 and R2 decrease at the same time and the proportion of decrease is close, so both the Vp and Vn remain basically unchanged. In short, so when pressing from front to back, Uo=Vp–Vn basically remains the same. Similarly, when the object to be measured subjected from a force applied from the back to the front, the Uo remains basically unchanged.

Therefore, the embodiment 3 of the bridge circuit can identify the pressure in the Z-axis (up and down) direction of the object to be measured according to the signal characteristics generated by Uo.

Bridge Circuit Embodiment 4:

When the group of force sensors R1 and R2 provided on the third surface 10c are used as a group of opposite bridge arms, and the group of force sensors R3 and R4 provided on the fourth surface 10d are used as another group of opposite bridge arms, the bridge circuit is electrically connected to the signal processing circuit to detect the deformation of the rigid structure 10 on the Y-axis and obtain the pressure of the Y-axis of the object to be measured.

Specifically, for the four force sensors shown in FIG. 9, referring to FIG. 4, after selecting through the analog switch, the a and e are short-circuited to the VCC, the b and g are short-circuited to the Vp, the f and c are short-circuited to the Vn, and the d and h are short-circuited to GND respectively. The bridge circuit shown in FIG. 7 is obtained.

Setting $VCC=Ui$, to obtain:

$Vp=R4Ui/(R1+R4)$;

$Vn=R2Ui/(R3+R2)$;

$Uo=Vp-Vn=(R3R4-R1R2)\ Ui/[(R1+R4)(R3+R2)]$  Formula group 4

Taking the derivation of R1, R2, R3 and R4 respectively, it can be seen that Uo increases with the increase of R4 and R3, and decreases with the increase of R1 and R2.

Z-Axis Deformation:

Viewed from the Z-axis (up and down) direction, R1 and R4 are in the same plane, and R2 and R3 are in the same plane.

When the object to be measured is subjected to a force from top to bottom, the rigid structure 10 will correspondingly generate a bending deformation from top to bottom, the R2 and R3 will be stretched approximately the same to lengthen the length of the force sensors, and the R1 and R4 will be stretched approximately the same and the length of the force sensor will be lengthened, that is, R2 and R3 increase at the same time and the increase ratio is close, and R1 and R4 decrease at the same time and the decrease ratio is close. Substitute the data before and after the change into Formula group 2, both Vp and Vn basically remain unchanged. So when pressing from top to bottom, Uo=Vp–Vn basically remains unchanged. Similarly, when the object to be measured is subjected to a force from bottom to top, the Uo remains basically unchanged.

Y-Axis Deformation:

Viewed from the Y-axis (front and rear) direction, the R1 and R2 are in the same plane, and the R3 and R4 are in the same plane.

When the object to be measured is subjected to a force from the front to the rear, the rigid structure 10 will follow the object to be measured to generate a front-to-back bending deformation. Affected by the curvature, the force sensor R2 and R3 will be stretched to lengthen the length of the force sensors, while R1 and R4 will be squeezed to reduce the length of the force sensors. So the R3 and R4 will increase and the R1 and R2 will decrease. When pressing from top to bottom, substitute the before and after the change of R into Formula group 2, and Uo=Vp−Vn will increase in the positive direction. Similarly, when the object to be measured is subjected to a force from the back to the front, the Uo will increase in the negative direction.

Therefore, the embodiment 4 of the bridge circuit can identify the pressure in the direction of the Y-axis (front and rear) according to the signal generated by Uo.

The above shows that by connecting the four force sensors to form different bridge circuits, or by using the analog switch to select the circuit in real time to form different bridge circuits, the force of different dimensions sensed by the object to be measured can be identified according to the signals, and multi-dimensional force sensing can be realized. In addition to detecting multi-dimensional deformation, the device of force sensing also has the advantages of small temperature and humidity drift, high sensitivity, and convenient installation.

Figure 10:
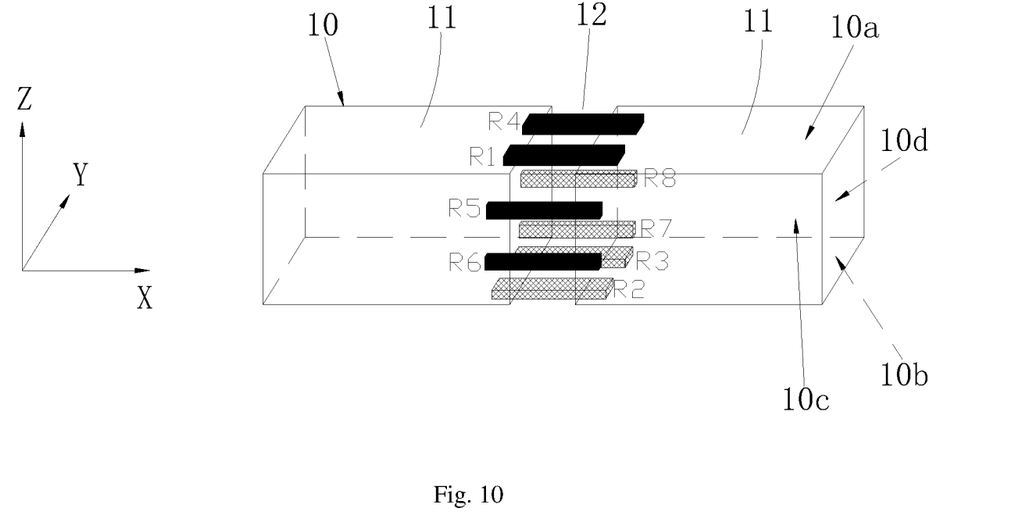
FIG. 10 is a three-dimensional structural view of a device of force sensing provided by another embodiment of the present application.

Referring to FIG. 10, in another embodiment of the present application, at least two bridge circuits are provided in the same strain amplification area 12. By connecting four force sensors to form different bridge circuits, or by using the analog switch to select the circuit in real time to form different bridge circuits, analyze different signal characteristics to identify the force of different dimensions sensed by the object to be measured, and multi-dimensional force sensing can be realized.

Specifically, eight resistors such as R1, R2, R3, R4, R5, R6, R7, and R8 are arranged on the four mounting surfaces of the strain amplification area 12. One embodiment is selected from the bridge circuit embodiments 1 and 2, and one embodiment is selected from the bridge circuit embodiments 3 and 4. By combining these two embodiments, multi-dimensional force sensing under different layouts can be obtained.

In another embodiment of the present application, by adding four resistors in the same area, various pressure signals can be obtained, which ensures the accuracy of the measure. It can also meet the performance requirements under the condition that some force sensors are damaged, which improves the reliability of the product. It should be pointed out that the number of sensors is not limited to 4 or 8, and it can be 1 channel or multi-channel. In addition to voltage measurement, pressure detection can also be realized by current or resistance measurement.

Figure 11:
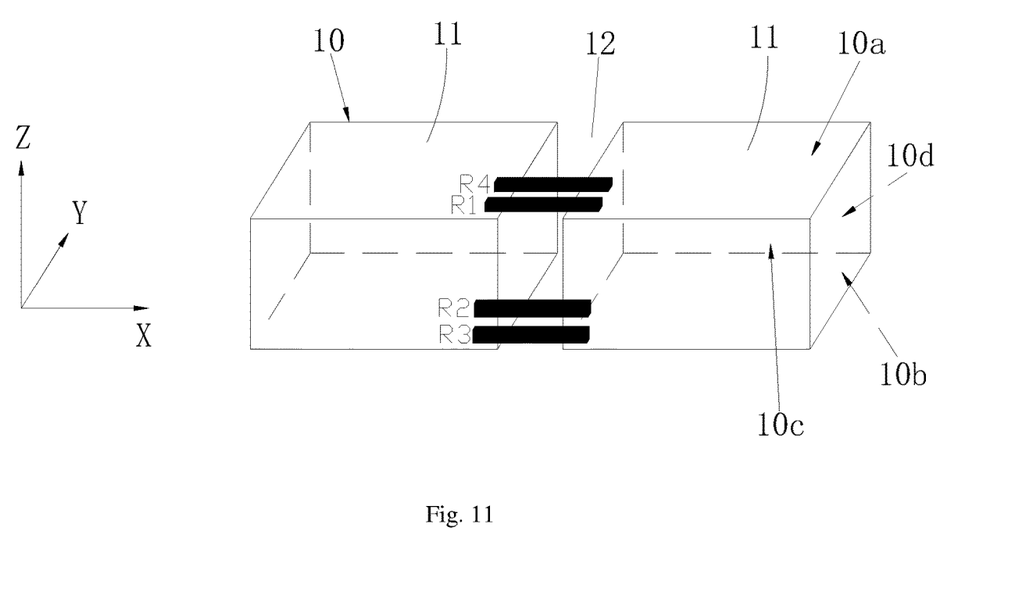
FIG. 11 is a three-dimensional structural view of a device of force sensing provided by another embodiment of the present application.

Referring to FIG. 11, in another embodiment of the present application, for the same bridge circuit, two groups of force sensors (one group includes R1 and R4, and the other group includes R2 and R3) are correspondingly disposed on two adjacent mounting surfaces, the plane where the two force sensors R2, R3 arranged adjacent to one mounting surface are located is perpendicular to the Y-axis, the plane where the two force sensors R1, R4 arranged adjacent to another mounting surface are located is perpendicular to the Z-axis. The four force sensors are connected to form different bridge circuits, and the bridge circuits are electrically connected to the signal processing circuit. Through different signal characteristics, the force of different dimensions sensed by the object to be measured can be identified, and multi-dimensional force sensing can be realized. The following is a description of an embodiment of a bridge circuit.

Bridge Circuit Embodiment 5:

When all the force sensors are arranged adjacent to the third surface 10c (or the fourth surface 10d) at the same time, and the force sensors located on the two mounting surfaces are spaced by a predetermined distance, the bridge circuit is electrically connected to the signal processing circuit to detect the deformation of the rigid structure 10 on the Z axis and obtain the pressure of the Z axis of the object to be measured.

Specifically, by simply arranging four force sensors on the first surface 10a and the third surface 10c of the rigid structure 10, after being electrically connected, it is assumed that the bridge circuit shown in FIG. 6 is formed.

Setting VCC=$Ui$, to obtain:

$Vp=R2Ui/(R1+R2);$ $Vn=R4Ui/(R3+R4);$ $Uo=Vp-Vn=(R2R3-R1R4)\ Ui/[(R1+R2)(R3+R4)]$   Formula group 5

Taking the derivation of R1, R2, R3 and R4 respectively, it can be seen that Uo increases with the increase of R2 and R3, and decreases with the increase of R1 and R4.

Viewed from the Z-axis (up and down) direction, R1 and R4 are in the same plane, and R2 and R3 are adjacent to the same plane.

When the object to be measured is subjected to a force from top to bottom, the rigid structure 10 will follow the object to be measured to generate a top-to-bottom bending deformation. Affected by the curvature, the force sensor R2 and R3 will be stretched to lengthen the length of the force sensors, while R1 and R4 will be squeezed to reduce the length of the force sensors. Here is an example of force sensors whose characteristic is that lengthening increases the resistance, so R2 and R3 will increase, and R1 and R4 will decrease. In short, when pressing from top to bottom, the R2 and R3 increase, and the R1 and R4 decrease. From the above conclusion, it can be seen that the Uo will increase in the positive direction.

Viewed from the Y-axis direction, R1 and R4, R2 and R3 are all adjacent to a plane. When the deformation of the Y-axis occurs, the impedance changes of the four force sensors are similar, and Uo is basically unchanged.

Therefore, the above-mentioned embodiment 5 can be used to identify the deformation in a certain direction, and one or more bridge circuits can be added to identify the deformation of the Y-axis. That is, multi-dimensional deformation can be identified.

It can be understood that when all the force sensors are arranged adjacent to the first surface 10a or the second surface 10b at the same time, and the force sensors respectively located on the two mounting surfaces are spaced by a predetermined distance, the bridge circuit is electrically connected to the signal processing circuit to detect the deformation of the rigid structure 10 on the Z axis and obtain the pressure of the Y axis of the object to be measured.

Referring to FIG. 1, in another embodiment of the present application, the force sensors are strain sensing resistors, and each strain sensing resistor is made of material selected from a group of polycrystalline semiconductor material, amorphous semiconductor material, polycrystalline silicon, graphene, copper-nickel alloy, carbon nanotube, metal thin wires, and conductor insulator composite material. All of the above solutions can achieve pressure sensing and can be selected as required.

Please refer to FIG. 1 to FIG. 3, in another embodiment of the present application, a method of force sensing is provided, which adopts the above-mentioned device of force sensing, and includes the following steps:

fitting the rigid structure 10 to the object to be measured; and connecting four force sensors R1, R2, R3, R4 in a same strain amplification area 12 to form different bridge circuits (as shown in FIGS. 6 to 8), the different bridge circuits are electrically connected to the signal processing circuit to detect deformation of the rigid structure 10 in different directions and obtain the force at a corresponding direction of the object to be measured.

The rigid structure 10 includes the rigid blocks 11 arranged at intervals, the strain amplification area 12 is formed between two adjacent rigid blocks 11, and every two of the four force sensors R1, R2, R3, R4 are used as a group, two groups of force sensors are selectively arranged on two of the mounting surfaces 10*a*, 10*b*, 10*c*, 10*d* of the strain amplification area 12, and the four force sensors are connected to form different bridge circuits. When in use, the rigid structure 10 is fitted to the object to be measured, and different bridge circuits are electrically connected to the signal processing circuit, so as to detect the deformation of the rigid structure 10 in different directions and obtain the force in the corresponding direction of the object to be measured. The device of force sensing has an integrated structure, which is easy to be mounted, the circuit is simple and the cost is low. The device of force sensing, the method of force sensing and the apparatus having the device of force sensing can very sensitively detect the small deformation of the object to be measured in the multi-dimensional direction, accurately identify the pressure, and the performance indicators of no false touch, high sensitivity, high anti-drop coefficient and high reliability, etc. are reached.

In another embodiment of the present application, for the four force sensors R1, R2, R3, and R4 of the same bridge circuit, the forces in different directions are identified by detecting the impedance changes of the force sensors. The following is an example of the force sensor shown in FIG. 3:

The object to be measured is subjected to the force of the Z-axis:

The force is applied from top to bottom, the R1 decreases, the R2 increases, the R3 increases, and the R4 decreases.

The force is applied from bottom to top, the R1 increases, the R2 decreases, the R3 decreases, and the R4 increases.

The object to be measured is subjected to the force of Y-axis:

The force is applied from front to back, the R1 decreases, the R2 decreases, the R3 increases, and the R4 increases.

The force is applied from back to front, the R1 increases, the R2 increases, the R3 decreases, and the R4 decreases.

The object to be measured is subjected to torsional force around the X axis:

Viewed from left to right, clockwise or counterclockwise twist occurs, and the R1, R2, R3, and R4 all increase.

Therefore, according to the impedance change characteristics of each force sensor, combined analysis can identify the forces in different dimensions. Other embodiments are similar and will not be described again. Specifically, the impedance change of each force sensor can be monitored in real time through the peripheral circuit, thereby identifying the forces in different directions.

In another embodiment of the present application, an apparatus is provided, which includes the object to be measured and the above-mentioned device of force sensing, and the rigid structure 10 is fitted to the object to be measured. Since the apparatus adopts all the technical solutions of all the above-mentioned embodiments, it also has all the beneficial effects brought by the technical solutions of the above-mentioned embodiments, which will not be repeated herein.

In another embodiment of the present application, the object to be measured is a panel or a frame. Enables force sensing of panel or frame. The panel or frame can be made of non-metallic materials such as glass, plastic, ceramics, etc. The panel may be a touch screen, display or other electronic terminal with rigid structure 10. The frame can be a frame of various electronic terminals. By connecting the force sensors to the panel or frame, it is possible to accurately identify the amount of the touch pressure, which expands the application space for electronic terminals in product application, human-computer interaction and consumer experience. The user can directly obtain the precise force level and quantity by touching the touch screen, display or electronic terminal. After calibration, the precise force can be obtained.

The above are only preferred embodiments of the present application and are not intended to limit the present application. Any modifications, equivalent replacements and improvements made within the fundamental designs and the principles of the present application shall be included within the protection scope of the present application.

What is claimed is:

1. A device of force sensing, comprising:
   a rigid structure, configured for fitting with an object to be measured and deforming with the object to be measured, wherein the rigid structure comprises rigid blocks spaced along a X-axis, a strain amplification area is formed between two adjacent rigid blocks, and the rigid structure is provided with four mounting surfaces formed around the strain amplification area; and
   a plurality of force sensors, arranged at the strain amplification area, wherein every two force sensors in four force sensors are used as a group, and two groups of the force sensors are selectively arranged corresponding to two of the mounting surfaces, the four force sensors are connected to form different bridge circuits, and the different bridge circuits are electrically connected to a signal processing circuit to detect deformation of the rigid structure in different directions and obtain a force at a corresponding direction of the object to be measured.

2. The device of force sensing according to claim 1, wherein two flexible substrates are respectively provided on the two mounting surfaces on the rigid structure correspondingly arranged with the two groups of the force sensors, and the two groups of the force sensors are respectively mounted on corresponding flexible substrate.

3. The device of force sensing according to claim 2, wherein the two flexible substrates are formed by bending a master substrate.

4. The device of force sensing according to claim 2, wherein the two flexible substrates and surfaces of the rigid structure are bonded by glue.

5. The device of force sensing according to claim 1, wherein the four force sensors, a power supply terminal, a ground terminal and a detection terminal of a same bridge circuit are connected through an analog switch.

6. The device of force sensing according to claim 1, wherein a length direction of each of the force sensors is in parallel with the X-axis; the four mounting surfaces are divided into a first surface and a second surface spaced along a Z-axis, and a third surface and a fourth surface spaced along a Y-axis, the first surface is configured as a bonding surface with the object to be measured, and the X-axis, the Y-axis and the Z-axis are perpendicular to each other.

7. The device of force sensing according to claim 6, wherein for a same bridge circuit, two groups of the force sensors are correspondingly arranged on the first surface and the second surface, a plane where the two force sensors arranged adjacent to the third surface being located is perpendicular to the Y-axis, and a plane where the two force sensors arranged adjacent to the fourth surface being located is perpendicular to the Y-axis;

when a group of the force sensors arranged on the first surface is configured as a group of opposite bridge arms, and a group of the force sensors arranged on the second surface is configured as another group of opposite bridge arms, the bridge circuit is electrically connected to the signal processing circuit to detect the deformation of the rigid structure on the Z-axis and to obtain a pressure of the Z-axis of the object to be measured; and when the two force sensors arranged adjacent to the third surface is configured as a group of opposite bridge arms, and the two force sensors arranged adjacent to the fourth surface is configured as another group of opposite bridge arms, the bridge circuit is electrically connected to the signal processing circuit to detect the deformation of the rigid structure on the Y-axis and to obtain a pressure of the Y-axis of the object to be measured.

8. The device of force sensing according to claim 6, wherein, for a same bridge circuit, two groups of the force sensors are correspondingly arranged on the third surface and the fourth surface, a plane where the two force sensors arranged adjacent to the first surface being located is perpendicular to the Z-axis, and a plane where the two force sensors arranged adjacent to the second surface being located is perpendicular to the Z-axis;

when the two force sensors arranged adjacent to the first surface is configured as a group of opposite bridge arms, and the two force sensors arranged adjacent to the second surface is configured as another group of opposite bridge arms, the bridge circuit is electrically connected to the signal processing circuit to detect the deformation of the rigid structure on the Z-axis and to obtain a pressure of the Z-axis of the object to be measured; and when a group of the force sensors arranged on the third surface is configured as a group of opposite bridge arms, and a group of the force sensors arranged on the fourth surface is configured as another group of opposite bridge arms, the bridge circuit is electrically connected to the signal processing circuit to detect the deformation of the rigid structure on the Y-axis and to obtain a pressure of the Y-axis of the object to be measured.

9. The device of force sensing according to claim 6, wherein, for a same bridge circuit, two groups of the force sensors are correspondingly arranged on two adjacent mounting surfaces, a plane where the two force sensors arranged adjacent to one of the two adjacent mounting surfaces being located is perpendicular to the Y-axis, and a plane where the two force sensors arranged adjacent to another of the two adjacent mounting surfaces being located is perpendicular to the Z-axis;

when all the force sensors are arranged adjacent to the third surface or the fourth surface at the same time, and the force sensors respectively located on the two mounting surfaces are spaced by a predetermined distance, the bridge circuit is electrically connected to the signal processing circuit to detect the deformation of the rigid structure on the Z-axis and to obtain a pressure of the Z-axis of the object to be measured; and when all the force sensors are arranged adjacent to the first surface or the second surface at the same time, and the force sensors respectively located on the two mounting surfaces are spaced by a predetermined distance, the bridge circuit is electrically connected to the signal processing circuit to detect the deformation of the rigid structure on the Z-axis and to obtain a pressure of the Y-axis of the object to be measured.

10. The device of force sensing according to claim 1, wherein at least two of the bridge circuits are provided in a same strain amplification area.

11. The device of force sensing according to claim 1, wherein the force sensors are strain sensing resistors, and each of the strain sensing resistors comprises at least one of polycrystalline semiconductor material, amorphous semiconductor material, polycrystalline silicon, graphene, copper-nickel alloy, carbon nanotubes, thin metal wires, or conductor-insulator composite materials.

12. The device of force sensing of claim 1, wherein the rigid structure is a steel sheet, an aluminum sheet, a glass sheet or an FR4 sheet.

13. A method of force sensing, which uses the device of force sensing according to claim 1, and the method comprising:

fitting a rigid structure on an object to be measured; and
connecting four force sensors in a same strain amplification area to form different bridge circuits, wherein the different bridge circuits are electrically connected to a signal processing circuit to detect deformation of the rigid structure in different directions and obtain a force at a corresponding direction of the object to be measured.

14. The method according to claim 13, wherein for the four force sensors of a same bridge circuit, forces acting in different directions are identified by detecting impedance changes of the four force sensors.

15. An apparatus, comprising an object to be measured and the device of force sensing according to claim 1, wherein the rigid structure is fitted on the object to be measured.

* * * * *